United States Patent
Chemtob

[15] 3,656,891
[45] Apr. 18, 1972

[54] PROCESS FOR THE PRODUCTION OF POTASSIUM SULFATE AND BORAX

[72] Inventor: Elie M. Chemtob, Claremont, Calif.

[73] Assignee: Occidental Petroleum Corporation, Los Angeles, Calif.

[22] Filed: Aug. 5, 1970

[21] Appl. No.: 61,218

[52] U.S. Cl. ................................................23/59, 23/121
[51] Int. Cl. ...................................................C01b 25/00
[58] Field of Search ..............................................23/59, 121

[56] References Cited

UNITED STATES PATENTS

| | | |
|---|---|---|
| 2,948,592 | 8/1960 | May.........................................23/121 X |
| 3,336,115 | 8/1967 | Rebum et al..........................23/121 X |
| 1,936,070 | 11/1933 | Ritchie et al..............................23/121 |
| 3,369,867 | 2/1968 | May........................................23/121 |

*Primary Examiner*—Herbert T. Carter
*Attorney*—Christie, Parker & Hale

[57] ABSTRACT

Glaserite and sylvite are digested in the presence of borax in a metathesis reactor at a temperature above the crystallization temperature of borax to form a borax free potassium sulfate precipitate and a metathesis liquor containing borax. Residual potassium values in the metathesis end liquor are converted to glaserite by sulfate ion addition for recycle to the metathesis reactor. Cooling the resultant solution then precipitates borax.

9 Claims, 3 Drawing Figures

FIG_1
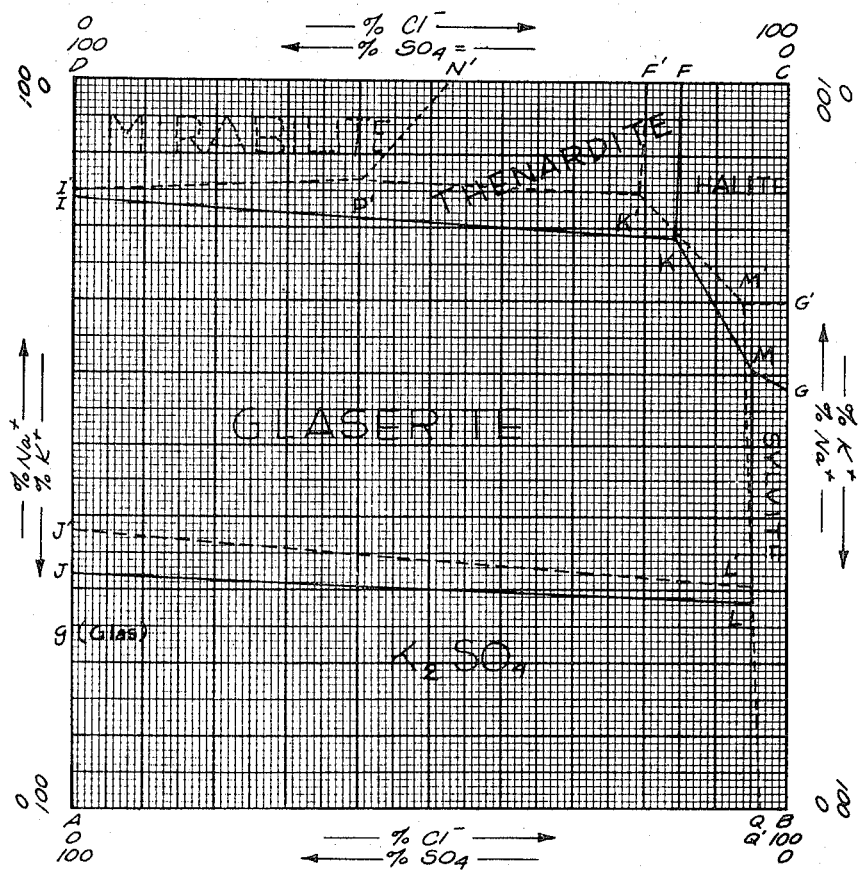
SYSTEM Na⁺, K⁺, Cl⁻, SO₄⁼ in the PRESENCE OF BORAX
- - - - - 25°C
——— 60°C
INVENTOR.
ELIE M. CHEMTOB
BY
Christie, Parker & Hale
ATTORNEYS

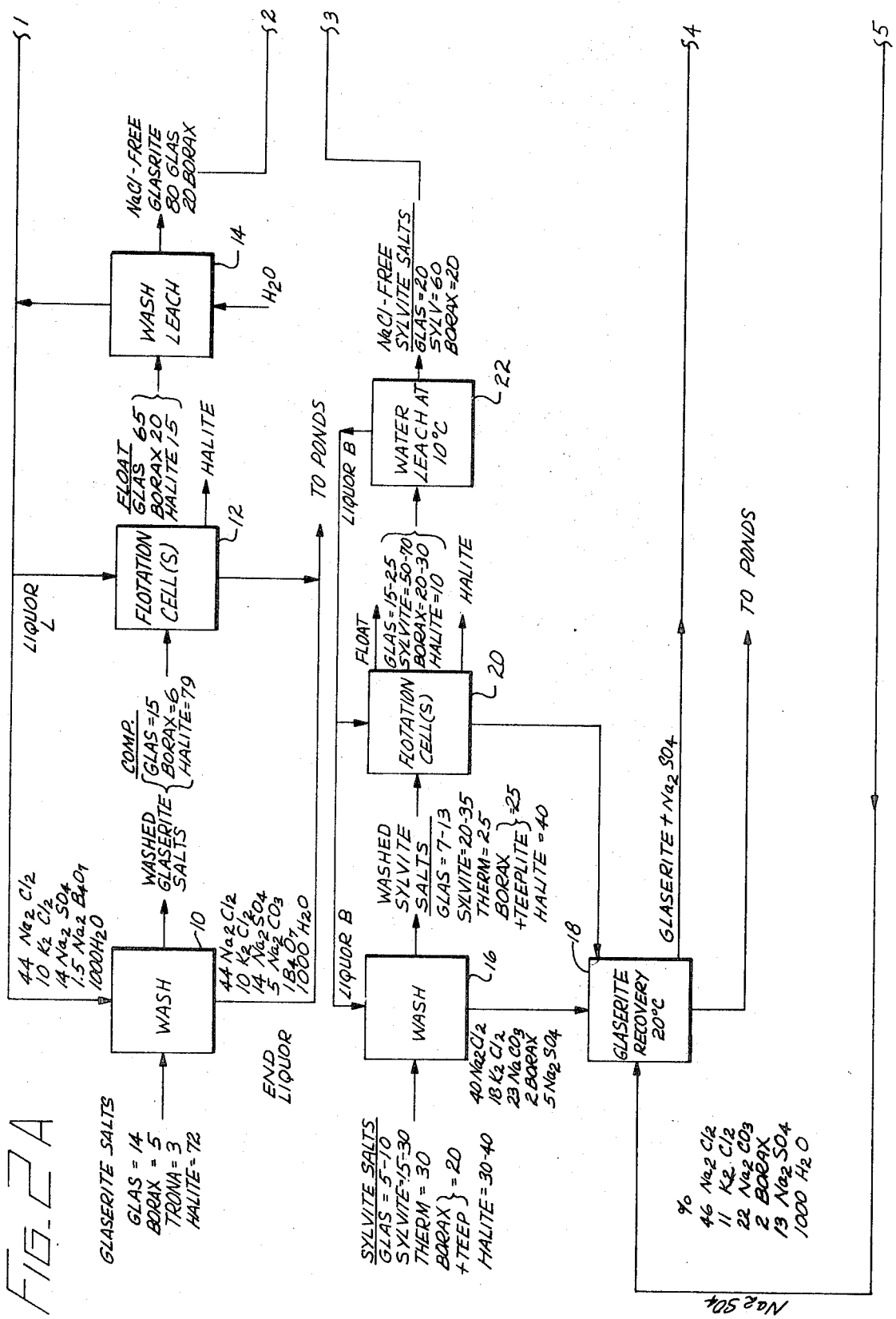

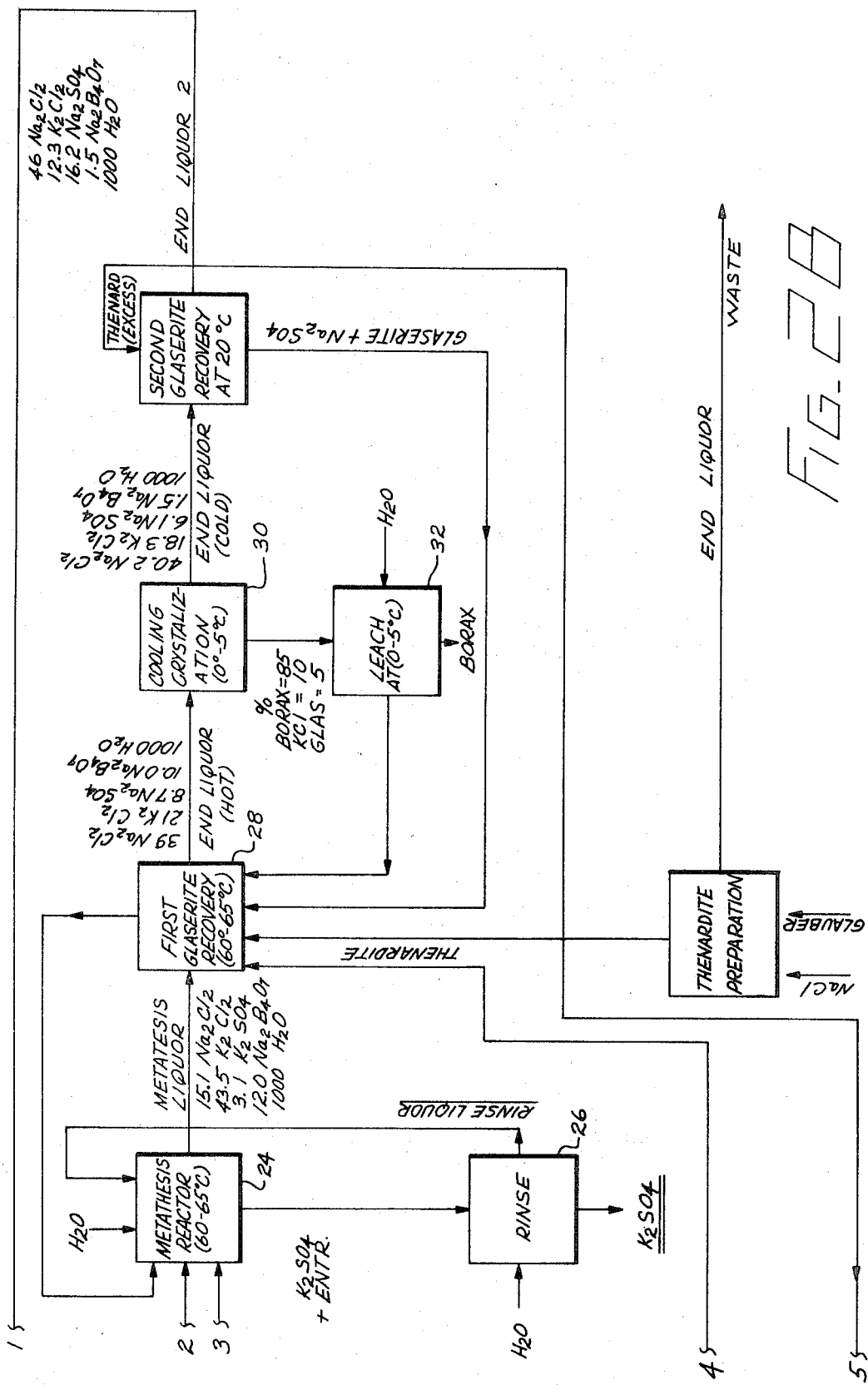

PROCESS FOR THE PRODUCTION OF POTASSIUM SULFATE AND BORAX

BACKGROUND OF THE INVENTION

The present invention relates to the production of potassium sulfate and borax from borax-containing salt groupings as obtained from a complex brine such as Searles Lake brine.

In U.S. Pat. No. 1,936,070 to Ritchie, it was disclosed that glaserite and potassium chloride could be digested in an aqueous solution insufficient to dissolve glaserite to precipitate potassium sulfate by the general reaction:

$$K_6Na_2(SO_4)_4 + 2KCl = 4K_2SO_4 + 2NaCl$$

While the technique disclosed provides a convenient route for producing potassium sulfate from relatively pure glaserite and sylvite, groupings of such purity, however, are most expensive to obtain under modern day technology and even more difficult to obtain from a complex salt system, such as Searles Lake brine. While it is possible to separate a complex brine into handleable salt groupings by various beneficiation and crystallization operations, when borax is present it eludes separation and appears as a deleterious impurity in most salt groupings.

SUMMARY OF THE INVENTION

It has now been found that glaserite and sylvite can be digested in a metathesis reactor in the presence of an aqueous solution containing borax at a temperature above the solubility temperature of borax to form a borax free potassium sulfate precipitate.

Residual potassium values in the resultant metathesis end liquor may then be recovered free of borax by sulfate ion addition.

Following glaserite recovery, the end liquor containing borax may then be cooled for recovery of fairly high purity borax.

This discovery is based on the finding that above its solubility temperature, borax will not interfere with the metathesis reaction nor adversely effect the sylvite-glaserite-potassium sulfate phase equilibria.

DRAWINGS

FIG. 1 is a phase equilibria diagram for a sodium ion-potassium ion-sulfate ion-chloride ion system in the presence of borax at both 25° and 65° C.

FIG. 2A is a flow diagram of the processing steps which may be used to prepare borax containing glaserite and sylvite salt groupings for reaction in a metathesis reactor.

FIG. 2B is a flow diagram of the processing steps which may be used in the formation of pure potassium sulfate and pure borax in metathesis and cooling operations.

DESCRIPTION

According to the present invention, there is provided a process for the production of pure potassium sulfate by the digestion of borax containing glaserite and sylvite salt groupings as obtained from a complex brine such as Searles Lake brine.

The process of this invention comprises, generally, forming glaserite and sylvite feeds containing borax, digesting glaserite and sylvite at a temperature above the solubility temperature of the borax to form a borax free potassium sulfate precipitate and a liquor contained dissolved borax. A major amount of residual potassium values in the liquor are then precipitated as glaserite free of borax by sulfate ion addition. The residual liquor which contains the borax is then cooled to a temperature sufficiently low to precipitate borax. The crystallized borax may then be washed to remove entrained salts for recovery as a pure product. Remaining potassium values may then be converted as glaserite by sulfate ion addition for return to the metathesis reactor.

By the practice of the process of this invention, there may be readily and economically obtained, potassium sulfate and borax as essentially pure products from a complex salt system.

This discovery is based on the finding that when dissolved, borax will not adversely affect the sodium ion-potassium ion-sulfate ion phase equilibria which is necessary for successful metathesis. In addition, borax will not precipitate with the potassium sulfate and that glaserite may also be precipitated free of borax by sulfate ion addition.

This may be more readily understood by reference to FIG. 1 which is a phase diagram of sodium ion-potassium ion-sulfate ion-chloride ion equilibria, in the presence of borax, at 25° and 60° C.

With reference thereto, for a system containing sodium ions (A–D;B–C) potassium ions (D–A;C–B) chloride ions (A–B;D–C) and sulfate ions (B–A;D–C) the following solid phases will appear at 25° C. depending on ion concentration.

Sylvite will appear as a solid for ion concentrations defined by the region B–Q′–M′–G′.

Potassium sulfate (K₂SO₄) will appear as a solid in the region Q′–L′–J′–A.

Glaserite will appear as a solid L′–J′–I′–P′–K′–M′.

Halite will appear as a solid in the region G′–M′–K′–F′–C.

Thenardite will appear in the region K′–P′–N′–F′.

Glauber's salt will exist in the region P′–I′–D–N′.

At 65° C., however, the phase boundaries shift slightly and the following solid phases may be obtained depending on ion concentration.

Sylvite will appear in the region B–Q–M–G.

Potassium sulfate will appear in the region Q–L–J–A.

Glaserite will appear in the region L–M–K–I–J.

Halite will appear in the region G–M–K–F–C. Thenardite will appear in the region F–K–I–D.

Glauber's salt will not appear.

While borax was to some degree a solid at 25° C., for the system studied, at 60° C. the borax went into solution and remained in solution during precipitation of both potassium sulfate by metathesis and glaserite by sulfate ion addition.

It was also determined that at this elevated temperature, borax had an unusually high solubility, namely, in the order of 12 mols or more per thousand mols of water as compared to the solubility of only 2 mols per thousand mols per water at 25° C.

In addition, the regions defined by glaserite and potassium sulfate were not materially changed by the increase in temperature nor did the sylvite-glaserite-potassium sulfate triple point materially shift.

This permitted both potassium sulfate and glaserite to be produced in economical quantities free of borax.

Once a substantial quantity of the residual potassium values were eventually recovered a glaserite, the resultant liquor, it was found, could then be cooled to crystallize borax. The borax did contain a minor amount of sylvite but this could be easily leached from the borax by washing.

Based on these findings, it was determined that the process illustrated in FIGS. 2A and 2B may be readily and economically employed for the production of both potassium sulfate and borax from a complex salt system. With reference thereto and for illustrative purposes, the process will be described in terms of processing fairly crude sylvite and glaserite salt groupings. To aid in understanding the process, pertinent salt compositions are shown for its several stages.

As a glaserite salt grouping there was obtained, by solar crystallization, a salt system containing a mol percent basis, 14 mol percent glaserite, 5 mol percent borax, 3 mol percent trona, and 78 mol percent halite.

From a second solar evaporation there was obtained a sylvite salt group containing component mol percent 5–10 mol percent glaserite; 15–30 mol percent sylvite; 30 mol percent thermonatrite; 20 mol percent borax and teepleite, and 30–40 mol percent halite.

With reference first to FIG. 2A, first step involved preparation of the salt groupings to eliminate the components which are not desired in the metathesis reactor.

The glaserite salts were washed with a mother liquor, obtained as a final residual liquor in the process in a wash zone 10 to remove trona and organics. The resultant wash liquor with extracted organics were then discarded by passing them to a pond (not shown).

The washed glaserite salts which contained essentially glaserite, borax and halite were sent to series flotation cells 12. There, through the addition of a flotation reagent selective for glaserite such as, for instance, a $C_{20}$ alkene sulfonate, there was obtained a float of high glaserite-borax concentration and low halite concentration. Halite was separated as a solid residue.

The residual halite was then washed from the glaserite-borax concentrate at a low temperature, (about 10° C.) in wash zone 14 the end liquor of which is combined with the liquor used to remove organics from fresh crude glaserite supply. The halite free, glaserite-borax grouping is then in condition for reaction in the metathesis reactor. As is typical, however, the borax evaded separation and was carried along with the glaserite as an impurity.

In a parallel operation, there was provided, for the metathesis reaction, a source of sylvite. Although a pure source of sylvite may be used, as it was obtained by solar evaporation, it was provided in the form of a mixture of salts. As borax was present in the brine which provided the sylvite, borax did, as shown, also appear.

Like the glaserite source, the source of sylvite is washed in wash zone 16 to remove organics. Where, as shown, some of the potassium salt values appear in the washed liquor, they were recovered by a separate operation.

Glaserite, in this instance, was washed from the sylvite salts and was recovered in zone 18 by cooling and sulfate addition. The recovered glaserite was then passed to the metathesis reactor for ultimate conversion to potassium sulfate.

Like glaserite, sylvite was beneficiated in flotation cells 20 to form a sylvite fraction of relatively high purity. As a suitable beneficiation reagent for sylvite there was used alkenes containing about 20 carbon atoms. Borax, it is noted, is also carried over with the sylvite float.

The float recovered was then leached in zone 22 for removal of halite to provide a halite-free sylvite salt grouping. The purified two salt groupings, namely, a glaserite salt grouping and sylvite salt grouping were then passed with the borax to a metathesis reactor.

With reference now to FIG. 2B, the metathesis reaction was carried out in the presence of water and at a temperature above the solubility of the borax present in reactor 24. For the amount of borax present in the above system, the temperature was between about 60° C. to about 65° C. It will be understood, however, that higher or lower temperatures can be employed so long as the borax dissolves.

The glaserite and sylvite are allowed to digest in the presence of water, with accompanying precipitation of potassium sulfite. Reaction was allowed to continue until equilibrium point (L) of the phase diagram of FIG. 1 was reached. As indicated, this represents the triple point between sylvite, glaserite and potassium sulfate and is unaffected by the presence of the dissolved borax at these metathesis reaction temperatures. Potassium sulfate which was formed was removed and washed in rinse tank 20 to remove any entrainments, and recovered as a pure solid, free of borax. The rinse liquor may be discarded, or, as shown, returned to the metathesis reactor.

As indicated by FIG. 1, the metathesis end liquor still contained a considerable quantity of potassium values. To recover them, the liquor is passed to a glaserite recovery stage 28 where sulfate ions are added without a temperature reduction to shift the equilibrium in the direction of the glaserite phase. Glaserite recovery is accomplished without deposition of borax with the glaserite.

While sulfate ion addition may be accomplished using any convenient source, as indicated in FIG. 2B, it may be conveniently provided by combining Glauber's salt and sodium chloride from another part of the extraction process to form thenardite.

While the amount of sulfite added is not critical, it is preferably added in an amount, based on the phase diagram shown in FIG. 1, to maximize glaserite precipitation.

The glaserite formed may be recovered as such or conveniently returned to the metathesis reactor 24 for further digestion with sylvite.

The liquor from the glaserite recovery was then cooled in crystallizer 30 to a temperature sufficiently low for borax to crystallize. For the system illustrated, this was between about 0° to 5° C.

As most of the potassium values remaining in the mother liquor had been removed in the first glaserite recovery operation the borax will precipitate substantially free of potassium chloride. In the operation shown in FIG. 2B, the crystallate obtained was 85 percent pure borax, the balance being a mixture of sylvite and glaserite.

This borax, however, is susceptible to convenient leach washing in leach tank 32 to remove the residual potassium values which may be recovered as such and returned to the metathesis reactor 24, or, as shown, to the first glaserite recovery zone 28.

Following this, the end liquor was warmed to approximately ambient temperature and by the addition of sulfate ion, additional potassium values are recovered as glaserite for return to the metathesis reactor 24, or, as shown, first glaserite recovery zone 28. This maximizes recovery of potassium values as potassium sulfate from the starting salts.

The end liquor was found to have salt composition which allows it to be readily utilized in the flotation cells and washing operations for the crude glaserite salts and/or sylvite salts.

As will be well understood by one skilled in the art, the process of this invention provides a unique method for the production of potassium sulfate in the presence of the otherwise hindering borax salts and allows both to be recovered as pure products free of interfering contamination by each.

While no wise limiting, the following example is a more detailed example of the procedures which may be carried out in the practice of the process of this invention.

EXAMPLE

There was obtained in a beneficiation operation a float having the composition:

| Component | Wt.% | Mol % |
|---|---|---|
| Halite (NaCl) | 25 | 34.1 |
| Glaserite ($3K_2SO_4 \cdot Na_2SO_4$) | 55 | 13.1 |
| Thenardite ($Na_2SO_4$) | 3 | 3.4 |
| Borax ($Na_2B_4O_7 \cdot 10H_2O$) | 12 | 5.0 |
| Water ($H_2O$) | 5 | 44.3 |
| Totals | 100.0 | 100.0 |

The salts were leached with water at 15° C. in an amount sufficient to provide 5.90 mols of water per mol of salt mixture. Water washing removed the NaCl and 17 percent of the $K^+$ values as $K_2SO_4$ and 5 percent of the $B_4O_7^=$ as $Na_2B_4O_7$. Water washing increased glaserite content and the resultant recovered glaserite salt system had the composition, on a water free basis.

| Component | Wt. % | Mol % |
|---|---|---|
| Glaserite | 78 | 62.0 |
| Thenardite | 2 | 11.0 |
| Borax | 20 | 27.0 |
| Total | 100 | 100.0 |

For each mol of this salt grouping, there was added 0.149 mols of borax to accent its interference on metathesis reaction.

The resultant salt mixture was added slowly to a metathesis reactor containing 30 mols of water per mol of salt mixture and $K_2Cl_2$ in an amount equal to 3.8 mols per mol of glaserite.

Metathesis was carried out for 1.5 hours at 65° C. All of the borax went into solution and pure $K_2SO_4$, 3.98 mols per mol glaserite, was obtained as the only solid phase.

The resultant end liquor was then treated for recovery of residual K$^+$ values. Anhydrous Na$_2$SO$_4$ was added in approximately equimolar quantities based on the mols of K$^+$ present. The system was allowed to equilibrate over a 2 hour period at 65° C. and sampled after 1.0, 1.5 and 2.0 hours. The analysis of the liquor and solids which formed is shown in Table I.

TABLE I

| Liquor, Mol % | Time, Hr. | | |
|---|---|---|---|
| | 1.0 | 1.5 | 2.0 |
| Na$_2$Cl$_2$ | 3.62 | 3.90 | 3.99 |
| K$_2$Cl$_2$ | 1.95 | 1.75 | 1.57 |
| Na$_2$SO$_4$ | 0.80 | 0.91 | 0..97 |
| Na$_2$B$_4$O$_7$ | 0.94 | 0.94 | 0.93 |
| H$_2$O | 93.0 | 92.5 | 92.7 |

| Solids, Wt. % | Time, Hr. | | |
|---|---|---|---|
| | 1.0 | 1.5 | 2.0 |
| 3K$_2$SO$_4$·Na$_2$SO$_4$ | 90.0 | 93.0 | 96.0 |
| Na$_2$SO$_4$ | 10.0 | 7.0 | 4.0 |
| Na$_2$B$_4$O$_7$·10H$_2$O | 0.0 | 0.0 | 0.0 |

The end liquor, after 2 hours, was then cooled to 20° C. and equilibrated for 6 hours. The crystallate formed had the composition.

| Component | Wt. % |
|---|---|
| Borax | 85 |
| Sylvite | 10 |
| Glaserite | 5 |

About 15 percent of the borax remained in solution. The salt was washed with 10.5 mols of water per mol of salt and solid borax of 99.7 percent purity was obtained.

The mother liquor from the cooling crystallization was treated for secondary recovery of potassium values at 20° C. An excess of anhydrous Na$_2$SO$_4$ was added and after 1.5 hours a solid mixture containing 27 mol percent glaserite and 73 mol percent thenardite was obtained. The potassium (K$^+$) content of the end liquor was reduced 30 percent.

What is claimed is:

1. A process for the production of potassium sulfate from glaserite and sylvite in the presence of borax which comprises digesting glaserite and sylvite in an aqueous solution containing at least the dissolved salts borax, glaserite, and sylvite in a metathesis reactor at a temperature at least sufficiently high to maintain all of the borax dissolved in solution for a time sufficient to form a precipitate of potassium sulfate free of borax and a hot metathesis end liquor containing at least the dissolved borax and residual potassium ions.

2. A process as claimed in claim 1 in which the metathesis reaction is carried out at a temperature above about 60° C.

3. A process as claimed in claim 1 in combination with the additional step of adding sulfate ion to the hot metathesis end liquor to precipitate at least part of the residual potassium ions as glaserite free of borax and a hot end liquor containing at least dissolved borax.

4. A process as claimed in claim 3 in which the precipitated glaserite is returned to the metathesis reactor for digestion with sylvite.

5. A process as claimed in claim 3 in which the hot end liquor is cooled to precipitate borax.

6. A process as claimed in claim 5 in which the precipitated borax is washed to remove impurities.

7. A process as claimed in claim 5 in which the hot end liquor is cooled to a temperature sufficiently low to precipitate substantially all of the borax and form a borax free end liquor containing potassium ions.

8. A process as claimed in claim 7 in which sulfate ion is added to the borax free end liquor to precipitate additional glaserite.

9. A process as claimed in claim 8 in which the precipitated glaserite is returned to the metathesis reactor for digestion with sylvite.

* * * * *